US012780109B2

(12) United States Patent
Lottes et al.

(10) Patent No.: US 12,780,109 B2
(45) Date of Patent: Nov. 3, 2026

(54) VIRTUAL EXTERIOR MIRROR SYSTEM FOR A VEHICLE

(71) Applicant: AUDI AG, Ingolstadt (DE)

(72) Inventors: Daniel Lottes, Ihrlerstein (DE); Marcus Richter, Ingolstadt (DE); Sebastian Albl, Ingolstadt (DE); Vincent Kratzer, Munich (DE); Philipp Weiss, Düsseldorf (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 18/843,108

(22) PCT Filed: Mar. 27, 2023

(86) PCT No.: PCT/EP2023/057860
§ 371 (c)(1),
(2) Date: Aug. 30, 2024

(87) PCT Pub. No.: WO2023/198439
PCT Pub. Date: Oct. 19, 2023

(65) Prior Publication Data

US 2025/0162514 A1 May 22, 2025

(30) Foreign Application Priority Data

Apr. 12, 2022 (DE) .................... 10 2022 108 885.5

(51) Int. Cl.
*B60R 11/02* (2006.01)
*B60R 1/26* (2022.01)
*B60R 11/00* (2006.01)

(52) U.S. Cl.
CPC ............ *B60R 11/0229* (2013.01); *B60R 1/26* (2022.01); *B60R 2011/0026* (2013.01);
(Continued)

(58) Field of Classification Search
CPC .................. B60R 11/0229; B60R 1/26; B60R 2011/0026; B60R 2011/008;
(Continued)

(56) References Cited

U.S. PATENT DOCUMENTS 6,757,085 B1 6/2004 Halldorsson
10,247,941 B2 4/2019 Fursich
(Continued)

FOREIGN PATENT DOCUMENTS

DE 202005015407 U1 1/2006
DE 102007032527 A1 2/2008
(Continued)

OTHER PUBLICATIONS

International Search Report of the International Searching Authority directed to related International Patent Application No. PCT/EP2023/057860, mailed Jul. 11, 2023, with attached English-language translation; 7 pages.

*Primary Examiner* — Nasim N Nirjhar
(74) *Attorney, Agent, or Firm* — Sterne, Kessler, Goldstein & Fox P.L.L.C.

(57) ABSTRACT

The present disclosure relates to a virtual exterior mirror system for a vehicle, said system comprising: a display screen integrated into a dashboard of the vehicle; and a reflection means, which is associated with the display screen and located between two A-pillars of the vehicle, for reflecting a display content, which is displayed by the display screen, into an eye of a driver of the vehicle.

20 Claims, 1 Drawing Sheet

(52) U.S. Cl.
CPC ... *B60R 2011/008* (2013.01); *B60R 2300/205* (2013.01); *B60R 2300/8066* (2013.01)

(58) Field of Classification Search
CPC ...... B60R 2300/205; B60R 2300/8066; B60R 2300/8026; B60R 1/00; G02B 2027/0159; G02B 2027/0181; G02B 27/01; G02B 2027/0141; G01C 21/365
See application file for complete search history.

(56) References Cited

U.S. PATENT DOCUMENTS

| | | | | |
|---|---|---|---|---|
| 2011/0175798 | A1 | 7/2011 | Sato et al. | |
| 2015/0070502 | A1* | 3/2015 | Murayama | B60R 1/26 348/148 |
| 2016/0209647 | A1* | 7/2016 | Fürsich | G02B 27/0075 |
| 2017/0334291 | A1* | 11/2017 | Fujita | H04N 9/3182 |
| 2018/0334101 | A1 | 11/2018 | Tschirhart | |
| 2019/0126824 | A1 | 5/2019 | Oba | |
| 2021/0061174 | A1* | 3/2021 | Kauffmann | B60K 35/00 |
| 2022/0413288 | A1 | 12/2022 | Lottes et al. | |
| 2024/0061240 | A1* | 2/2024 | Hirata | G02B 30/25 |

FOREIGN PATENT DOCUMENTS

| | | | |
|---|---|---|---|
| DE | 102016214673 | A1 | 2/2018 |
| DE | 102016220965 | A1 | 4/2018 |
| DE | 102017216523 | A1 | 3/2019 |
| WO | WO 2021/110889 | A1 | 6/2021 |

* cited by examiner

VIRTUAL EXTERIOR MIRROR SYSTEM FOR A VEHICLE

TECHNICAL FIELD

Various embodiments of the present disclosure relate to a virtual exterior mirror system for a vehicle, said system comprising a display screen integrated into a dashboard of the vehicle and a reflection means which is associated with the display screen and located between two A-pillars of the vehicle for reflecting a display content which is displayed by the display screen into an eye of a driver of the vehicle. Furthermore, various embodiments of the present disclosure relate to a vehicle.

Virtual exterior mirror systems for vehicles in various designs are part of the prior art and, like conventional lateral exterior mirrors, are used to allow a driver of a vehicle to view the rear area of the vehicle without the driver having to turn his head.

Virtual exterior mirror systems are referred to as virtual because they simulate a function of a conventional lateral exterior mirror without a conventional lateral exterior mirror. A virtual exterior mirror system usually comprises a display unit that is visually perceptible by the driver of the vehicle without turning his head and is configured to display a video stream depicting a rear area of the vehicle.

BACKGROUND

For example, DE 10 2007 032 527 A1 discloses a virtual exterior mirror system for a vehicle, which comprises a display screen provided on an A-pillar of the vehicle or a projection surface provided on an A-pillar of the vehicle for displaying or projecting a video stream which depicts a rear area of the vehicle.

DE 20 2005 015 407 U1 discloses another virtual exterior mirror system for a vehicle, in which a projector projects a video stream depicting a rear area of the vehicle onto a triangular film which is located on an inner side of a front portion of a side window of the vehicle with respect to an x-direction of the vehicle.

DE 10 2016 220 965 A1 also discloses a virtual exterior mirror system for a vehicle. The virtual exterior mirror system is designed as a head-up display and comprises a holographic element located as a reflection means in an upper edge region of a windshield of the vehicle with respect to a z-direction of the vehicle.

BRIEF DESCRIPTION OF THE DRAWINGS

The accompanying drawings are incorporated herein and form a part of the specification.

DETAILED DESCRIPTION

Figure 1:
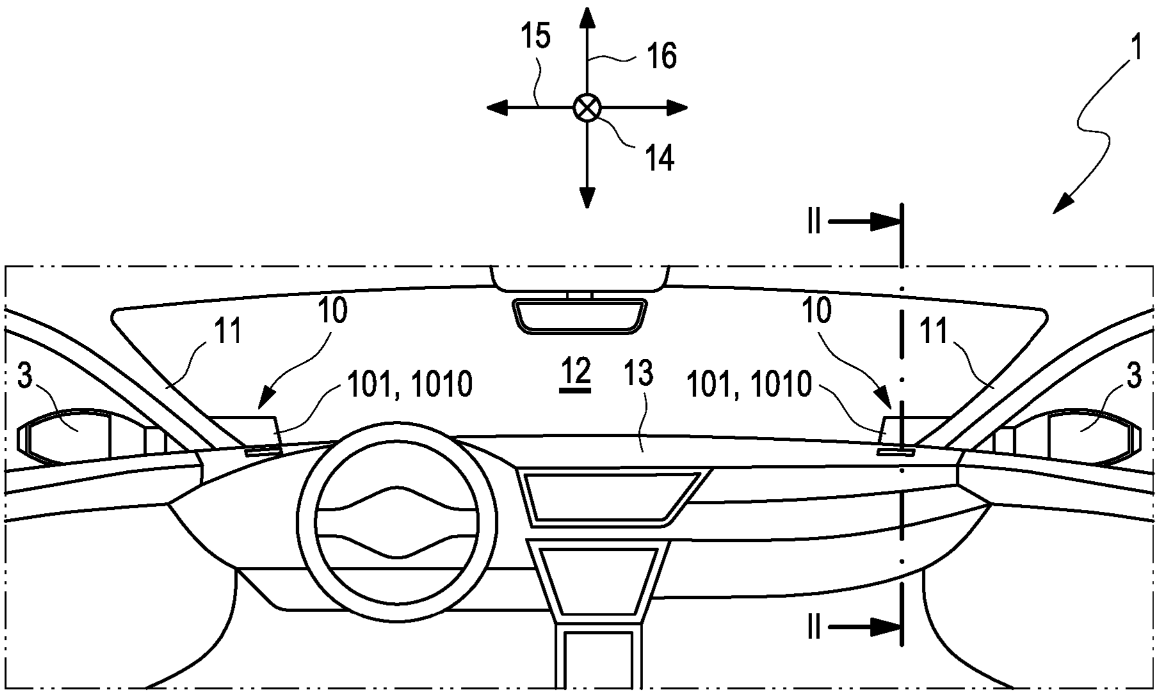
FIG. 1 illustrates an exemplary partial view of a vehicle, according to some embodiments.

As is common practice, a front-rear direction of the vehicle is referred to as an x-direction, a left-right direction of the vehicle is referred to as a y-direction, and an up-down direction of the vehicle is referred to as a z-direction, where the x-direction, the y-direction, and the z-direction define a right-handed Cartesian coordinate system.

Vehicle manufacturers often offer virtual exterior mirror systems and conventional exterior mirrors as alternative equipment options.

The above virtual exterior mirror systems are incompatible with applicable regulations, provide a display of a video stream depicting a rear area of the vehicle in an unusual or unergonomic position or require specific variants of the windshield, side windows, an interior panel of an A-pillar of the vehicle or a dashboard of the vehicle.

Various embodiments of the present disclosure provide a virtual exterior mirror system for a vehicle which is compatible with applicable regulations, provides a display of a video stream depicting a rear area of the vehicle in an ergonomic and at least approximately familiar position and requires as few specific variants of other components of the vehicle as possible. Various embodiments of the present disclosure also provide a vehicle.

Various embodiments of the present disclosure provide a virtual exterior mirror system for a vehicle, said system comprising a display screen integrated into a dashboard of the vehicle and a reflection means which is associated with the display screen and located between two A-pillars of the vehicle for reflecting a display content which is displayed by the display screen into an eye of a driver of the vehicle. The exterior mirror system comprises a display screen and a reflection means. Accordingly, the exterior mirror system is designed to provide the driver with a virtual display of the display content.

A virtual display is a display that allows a display content to appear to a viewer by means of a reflection at a position different from a position of the display screen and a position of the reflection means, namely with respect to a viewing direction of the viewer behind the reflection means. The virtual display is different from a projected display, in which the display content appears to a viewer on a projection surface.

In accordance with various embodiments of the present disclosure, the reflection means comprises a reflection plate and is designed as a separate component from a windshield of the vehicle and is located between the windshield and the eye of the driver with respect to an x-direction of the vehicle. From the driver's perspective, the reflection plate is located in front of the windshield. Thanks to the reflection plate designed separately from the windshield, the virtual exterior mirror system does not require a specific variant of the windshield or side windows. The reflection means may comprise a carrier on which the reflection plate is held. The carrier allows the reflection means to be attached to the vehicle.

The dashboard may comprise the reflection plate. For example, a carrier of the reflection means can be permanently connected to the dashboard.

Alternatively or additionally, an interior panel of an A-pillar may comprise the reflection plate. For example, a carrier of the reflection means can be permanently connected to the interior panel of the A-pillar.

Alternatively, the reflection plate can be designed as a separate component from the dashboard and the A-pillar. For example, a carrier of the reflection means can be detachably connected to the dashboard, the interior panel and/or the windshield. In this way, the reflection means does not require a specific component of the vehicle.

Preferably, the reflection plate is clamped between the windshield and an A-pillar. The clamping may be made possible by providing an interference fit of the reflection plate with a gap formed between the windshield and the A-pillar. This is accompanied by a particularly simple installation of the reflection plate.

The display screen may be designed as a liquid crystal display (LCD) and/or comprise ultra-bright light emitting diodes (LEDs) and/or comprise a heater. The liquid crystal display is a proven flat display medium and is readily available. The ultra-bright light emitting diodes provide sufficient light intensity to visually perceive the display content even in strong sunlight. The heater reduces or eliminates streaking effects of a liquid display.

The reflection plate may comprise a WCF (windshield combiner film) layer. The WCF layer allows the driver to visually perceive the reflected display content without interference, even when wearing sunglasses with a polarizing filter.

The virtual exterior mirror system advantageously comprises a camera directed into a rear area of the vehicle and a control device functionally connected to the camera and designed to provide a video stream depicting the rear area provided by the camera as the display content for the display screen. The control device is configured to receive the video stream from the camera, process the received video stream, and send the processed video stream as the display content to the display screen. The video stream can be processed by means of common video processing means and in common video processing methods.

Ideally, the reflection plate is located in a lower region of the windshield with respect to the z-direction and/or in a right or left region of the windshield with respect to a y-direction of the vehicle. A position in a lower right corner region of the windshield or in a lower left region of the windshield is compatible with applicable regulations, ergonomic and corresponds approximately to a position familiar from conventional exterior mirrors.

In particular, the reflection plate can be located like a conventional exterior mirror with respect to the z-direction. In other words, a vertical height of the reflection plate is equal to a vertical height of the conventional exterior mirror, thereby achieving an exact match with a conventional exterior mirror with respect to vertical height.

Advantageously, the reflection plate is designed to be pivotable. The reflection plate can be pivotably held or mounted on a carrier of the reflection means. By pivoting the reflection plate, the virtual exterior mirror system can be adjusted to the position of the eye of the driver.

In many embodiments, the virtual display system comprises two display screens and two reflection plates each associated with a display screen. In this way, the virtual display system allows simultaneous simulation of a conventional left exterior mirror and a conventional right exterior mirror.

Various embodiments of the present disclosure also provide a vehicle comprising two A-pillars spaced apart from one another, a windshield located between the A-pillars with respect to a y-direction of the vehicle, a dashboard located below the windshield with respect to a z-direction of the vehicle, and a virtual exterior mirror system. The virtual exterior mirror system simulates a function of one or two conventional exterior mirrors, which are usually mounted on or adjacent to an A-pillar of the vehicle.

In accordance with various embodiments of the present disclosure, the virtual exterior mirror system is designed in accordance with various embodiments of the present disclosure. The virtual exterior mirror system in accordance with an embodiment of the present disclosure is compatible with applicable regulations, provides a display of a video stream depicting a rear area of the vehicle in an ergonomic and at least approximately familiar position and requires as few specific variants of other components of the vehicle as possible.

A significant advantage of the virtual exterior mirror system in accordance with various embodiments of the present disclosure is that few specific variants of other components of the vehicle are required, which makes the vehicle simple and cost-effective to manufacture. It is also advantageous that conformity with applicable regulations is ensured and great ergonomics are achieved while maintaining the usual usage behavior of conventional exterior mirrors. In addition, the virtual exterior mirror system can be visually integrated into a head-up display of the vehicle located in the lower edge region of a windshield and does not otherwise interfere with the aesthetics of the vehicle, for example through a cover.

FIG. 1 is a partial view of a vehicle 1 in accordance with an embodiment of the present disclosure. The vehicle 1 comprises, in a manner known per se, two A-pillars 11 spaced apart from one another, a windshield 12 located between the A-pillars 11 with respect to a y-direction 15 of the vehicle 1, and a dashboard 13 located below the windshield 12 with respect to a z-direction 16 of the vehicle 1.

Figure 2:
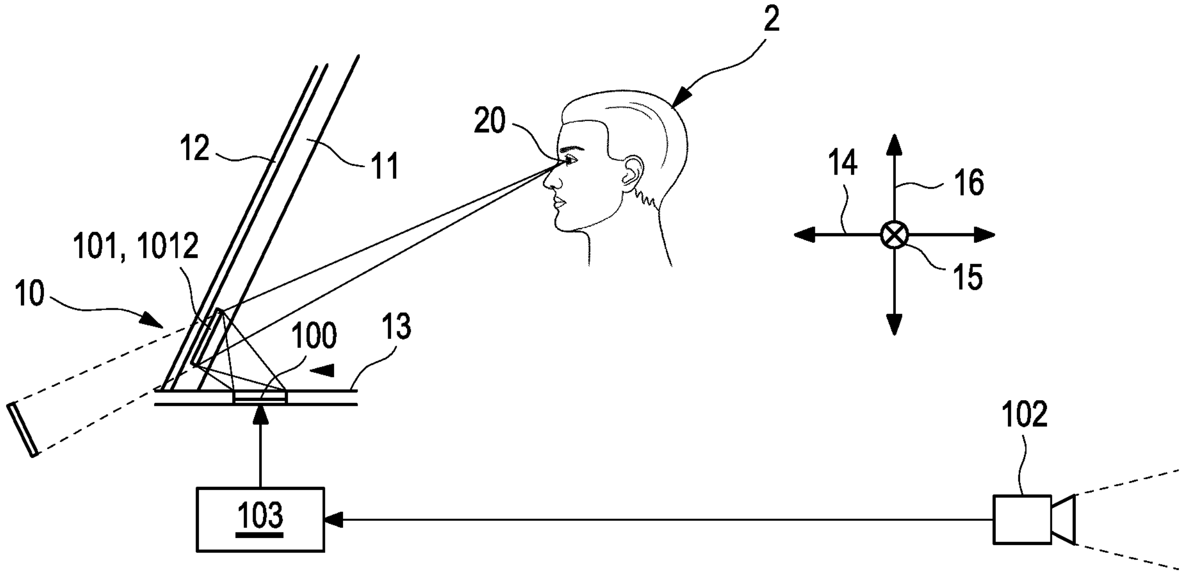
FIG. 2 illustrates an example of the vehicle shown in FIG. 1 in a partial sectional view along the section line designated II in FIG. 1.

FIG. 2 shows the vehicle 1 shown in FIG. 1 in a partial sectional view along the section line designated II in FIG. 1. The vehicle 1 further comprises a virtual exterior mirror system 10 in accordance with an embodiment of the present disclosure. The virtual exterior mirror system 10 is suitable for the vehicle 1 and comprises a display screen 100 integrated into the dashboard 13 of the vehicle 1 and a reflection means 101 which is associated with the display screen 100 and located between the two A-pillars 11 of the vehicle 1 for reflecting a display content which is displayed by the display screen 100 into an eye 20 of a driver 2 of the vehicle 1.

The reflection means 101 comprises a reflection plate 1010, is designed as a separate component from a windshield 12 of the vehicle 1 and is located between the windshield 12 and the eye 20 of the driver 2 with respect to an x-direction 14 of the vehicle 1.

The dashboard 13 may comprise the reflection plate 1010. Alternatively, an interior panel of an A-pillar 11 may comprise the reflection plate 1010. Alternatively, the reflection plate 1010 can be designed as a separate component from the dashboard 13 and the A-pillar 11.

It is possible that the reflection plate 1010 is clamped between the windshield 12 and an A-pillar 11.

Preferably, the display screen 100 is designed as a liquid crystal display (LCD) and/or the display screen comprises ultra-bright light emitting diodes (LEDs) and/or the display screen comprises a heater and/or the reflection plate 1010 comprises a WCF (windshield combiner film) layer.

Advantageously, the virtual exterior mirror system 10 comprises a camera 102 directed into a rear area of the vehicle 1 and a control device 103 functionally connected to the camera 102. The control device 103 is configured to provide a video stream depicting the rear area provided by the camera as the display content for the display screen 100.

Ideally, the reflection plate 1010 is located in a lower region of the windshield 12 with respect to the z-direction 16 and/or in a right or left region of the windshield 12 with respect to a y-direction 15 of the vehicle 1. The reflection plate 1010 can also be located like a conventional exterior mirror with respect to the z-direction 16. The reflection plate 1010 can alternatively or additionally be designed to be pivotable.

The virtual exterior mirror system optionally comprises two display screens 100 and two reflection plates 1010 each associated with a display screen 100.

LIST OF REFERENCE NUMBERS

1 Vehicle
10 Virtual exterior mirror system
11 A-pillar
12 Windshield
13 Dashboard
14 X-direction
15 Y-direction
16 Z-direction
100 Display screen
101 Reflection means
1010 Reflection plate
102 Camera
103 Control device
2 Driver
20 Eye
3 Conventional exterior mirror

The invention claimed is:

1. A virtual exterior mirror system for a vehicle, the system comprising:
a display screen integrated into a dashboard of the vehicle; and
a reflection plate configured to reflect a display content, wherein:
the reflection plate is associated with the display screen and located between a first A-pillar of the vehicle and a second A-pillar of the vehicle,
the display screen is configured to display the display content into an eye of a driver of the vehicle,
the display content is single reflected by the reflection plate from the display screen to the eye of the driver,
the reflection plate is separate from and not attached to a windshield of the vehicle, and
the reflection plate is located between the windshield and the eye of the driver with respect to an x-direction of the vehicle.

2. The virtual exterior mirror system of claim 1, wherein:
the dashboard comprises the reflection plate, or
an interior panel of the first A-pillar comprises the reflection plate, or
the reflection plate is separate from the dashboard and the first A-pillar.

3. The virtual exterior mirror system of claim 1, wherein the reflection plate is clamped between the windshield and the first A-pillar.

4. The virtual exterior mirror system of claim 1, wherein the display screen comprises a liquid crystal display, an ultra-bright light emitting diode, a heater, or a windshield combiner film (WCF) layer.

5. The virtual exterior mirror system of claim 1, further comprising:
a camera directed to a rear area of the vehicle; and
a controller in communication with the camera, wherein the controller provides a video stream depicting the rear area as the display content for the display screen.

6. The virtual exterior mirror system of claim 1, wherein the reflection plate is located in a lower region of the windshield with respect to a z-direction of the vehicle, a right region of the windshield with respect to a y-direction of the vehicle, or a left region of the windshield with respect to the y-direction of the vehicle.

7. The virtual exterior mirror system of claim 1, wherein a location height of the reflection plate and a location height of a conventional exterior mirror are equal with respect to a z-direction.

8. The virtual exterior mirror system of claim 1, wherein the reflection plate is pivotable.

9. The virtual exterior mirror system of claim 1, further comprising:
a secondary display screen; and
a secondary reflection plate associated with the secondary display screen.

10. A vehicle comprising:
a first A-pillar;
a second A-pillar spaced apart from the first A-pillar;
a windshield arranged between the first A-pillar and the second A-pillar with respect to a y-direction of the vehicle;
a dashboard located below the windshield with respect to a z-direction of the vehicle; and
a virtual exterior mirror system comprising:
a display screen integrated into the dashboard; and
a reflection plate configured to reflect a display content, wherein:
the reflection plate is associated with the display screen and located between the first A-pillar and the second A-pillar,
the display screen is configured to display the display content into an eye of a driver of the vehicle,
the display content is single reflected by the reflection plate from the display screen to the eye of the driver,
the reflection plate is separate from and not attached to the windshield, and
the reflection plate is located between the windshield and the eye of the driver with respect to an x-direction of the vehicle.

11. The vehicle of claim 10, wherein:
the dashboard comprises the reflection plate, or
an interior panel of the first A-pillar comprises the reflection plate, or
the reflection plate is separate from the dashboard and the first A-pillar.

12. The vehicle of claim 10, wherein the reflection plate is clamped between the windshield and the first A-pillar.

13. The vehicle of claim 10, wherein the display screen comprises a liquid crystal display, an ultra-bright light emitting diode, a heater, or a windshield combiner film (WCF) layer.

14. The vehicle of claim 10, the virtual exterior mirror system further comprising:
a camera directed to a rear area of the vehicle; and
a controller in communication with the camera, wherein the controller provides a video stream depicting the rear area as the display content for the display screen.

15. The vehicle of claim 10, wherein the reflection plate is located in a lower region of the windshield with respect to the z-direction, a right region of the windshield with respect to the y-direction, or a left region of the windshield with respect to the y-direction.

16. The vehicle of claim 10, wherein a location height of the reflection plate and a location height of a conventional exterior mirror are equal with respect to a z-direction.

17. The vehicle of claim 10, wherein the reflection plate is pivotable.

18. The vehicle of claim 10, the virtual exterior mirror system further comprising:
a secondary display screen; and a secondary reflection plate associated with the secondary display screen.

19. The virtual exterior mirror system of claim 1, further comprising another display screen integrated into the dashboard of the vehicle, wherein the other display screen is configured to display the display content simultaneously with the display screen.

20. The vehicle of claim 10, the virtual exterior mirror system further comprising another display screen integrated into the dashboard of the vehicle, wherein the other display screen is configured to display the display content simultaneously with the display screen.

* * * * *